(12) United States Patent
Salmon (10) Patent No.: US 6,267,542 B1
(45) Date of Patent: Jul. 31, 2001

(54) DRILL BIT HAVING A CHISELESS BIT TIP

(76) Inventor: Avraham Salmon, P.O. Box 6497, Ganey Yehuda, 56905 (IL)

( * ) Notice: Subject to any disclaimer, the term of this patent is extended or adjusted under 35 U.S.C. 154(b) by 0 days.

(21) Appl. No.: 09/231,666

(22) Filed: Jan. 15, 1999

(51) Int. Cl.[7] .................................................. B23B 51/02
(52) U.S. Cl. .......................................... 408/223; 408/230
(58) Field of Search .................................. 408/223, 224, 408/211, 713, 227, 230, 145

(56) References Cited

U.S. PATENT DOCUMENTS

| Re. 247,699 | 1/1960 | Willingham . | |
|---|---|---|---|
| 305,625 | 9/1884 | Newey, Jr. . | |
| 1,069,930 | * 8/1913 | Down | 408/230 |
| 1,418,485 | * 6/1922 | Smith | 408/224 |
| 1,467,491 | * 9/1923 | Oliver | 408/230 |
| 2,334,089 | * 11/1943 | Hallden | 408/211 |
| 2,401,307 | 6/1946 | Manewich . | |
| 2,898,786 | * 8/1959 | Willingham | 408/211 |
| 3,028,773 | 4/1962 | Borneman . | |
| 3,452,625 | 7/1969 | Russo . | |
| 3,564,947 | * 2/1971 | Maier | 408/230 |
| 3,824,026 | 7/1974 | Gaskins | 408/210 |
| 4,143,723 | 3/1979 | Schmotzer | 175/410 |
| 4,373,839 | 2/1983 | Negishi et al. | 408/59 |
| 4,556,347 | * 12/1985 | Barish | 408/230 |
| 4,565,471 | 1/1986 | Negishi et al. | 408/204 |
| 4,645,389 | 2/1987 | Maier | 408/230 |
| 4,671,710 | 6/1987 | Araki | 408/205 |
| 4,687,388 | 8/1987 | Yokota et al. | 408/230 |
| 4,770,571 | * 9/1988 | Potemkin | 408/713 |
| 5,092,718 | 3/1992 | Shallenberger | 408/188 |
| 5,184,689 | * 2/1993 | Sheirer et al. | 408/211 |
| 5,304,020 | 4/1994 | Reccius | 408/205 |

FOREIGN PATENT DOCUMENTS

| 244711 | * 1/1966 | (AT) | 408/224 |
|---|---|---|---|
| 537476 | * 4/1993 | (EP) | 408/211 |
| 832238 | * 4/1960 | (GB) | 408/223 |
| 1514510 | * 10/1989 | (SU) | 408/713 |

* cited by examiner

*Primary Examiner*—Daniel W. Howell
(74) *Attorney, Agent, or Firm*—Welsh & Flaxman LLC (57) ABSTRACT

A drill bit for drilling a bore is disclosed. The drill bit includes a body having a shank portion, a tip portion and an axis of rotation therethrough. The tip portion has a plurality of touching points, wherein all of the plurality of touching points form a plurality of cutting edges that are aligned along the entire length of a common diameter line. Alternately, the plurality of cutting edges may be aligned along the entire length of a diameter of the drill bit on different diameter lines.

8 Claims, 10 Drawing Sheets

DRILL BIT HAVING A CHISELESS BIT TIP

FIELD OF THE INVENTION

The invention relates to a chiseless drill bit tip. More particularly, the invention relates to a drill bit tip in which all touching points between the drill and the drilled bore are cutting points.

BACKGROUND OF THE INVENTION

Figure 1:
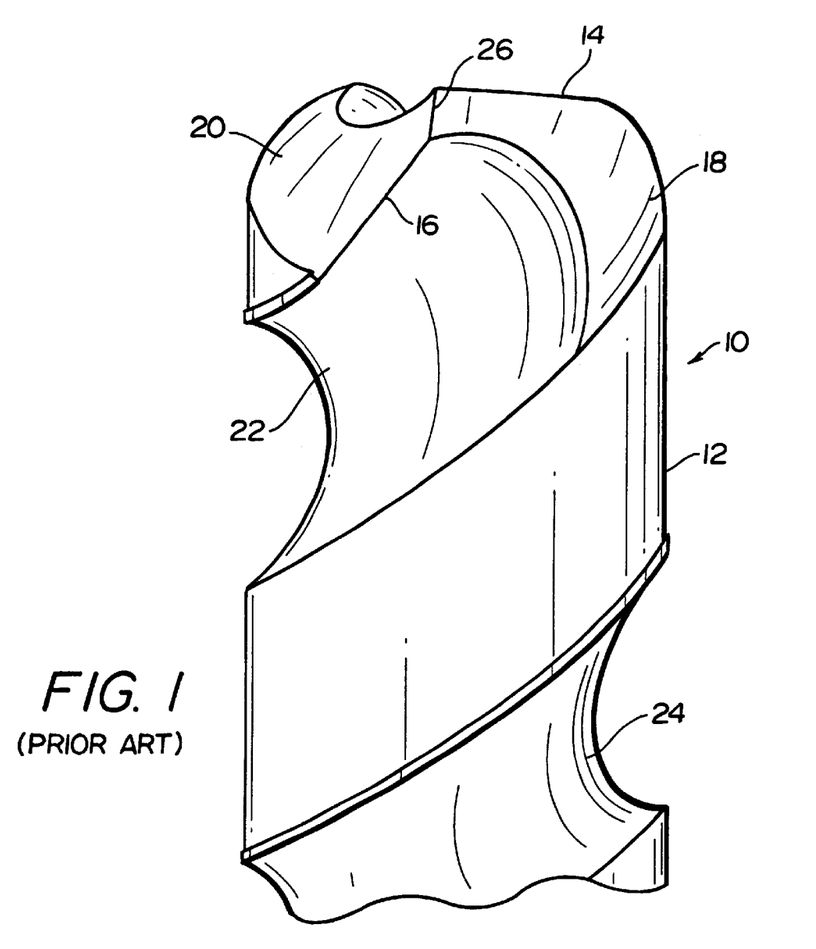
FIG. 1 is a perspective view of the leading end portion of a prior art drill bit with a chisel tip.

Drill bits having tips of varying shapes and serving different purposes are well known in the art. In most instances, the drill bit tips form a chisel structure that effectively pushes the drilled material to the side while the drill is rotating. Unfortunately, however, these drill bit tips create friction and produce undesired heat. FIG. 1 is illustrative of this type of conventional solid type drill bit. The prior art drill bit 10 comprises a shank 12 with cutting edges 14 and 16. Each cutting edge 14 and 16 is defined by the intersection of one of the relief surfaces 18 and 20 and its respective rake surface 22 and 24. Further, the two relief surfaces 18 and 20 form a cusp or chisel edge 26 at the tip of the drill bit 10.

The prior art does disclose various different drill bit tips, but each fails to suggest a structure which would provide a relief angle. Specifically, U.S. Pat. No. 4,671,710 eliminates the chisel by forming recessed surfaces in the neighborhood of the axis of rotation of the drill. However, due to the inner cone of the "v" shape and the width of cone "δ", this structure makes the non-cutting zone smaller and provides no relief angle to the inner cutting edges.

Figure 2A:
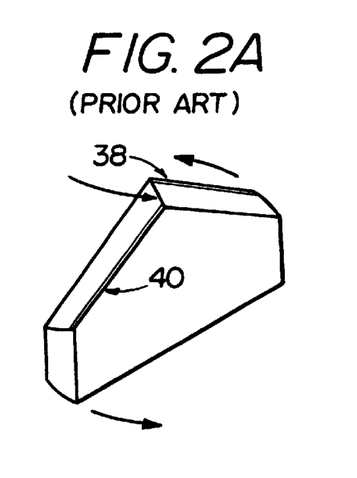
FIG. 2A is a perspective view of a prior art carbide drill tip.
Figure 2B:
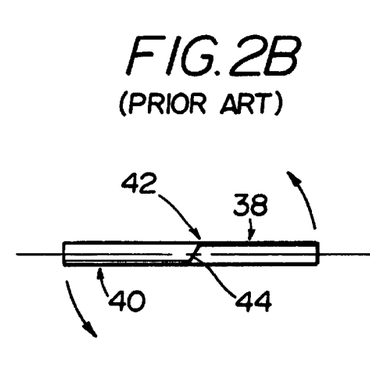
FIG. 2B is a plan view of the drill bit tip of FIG. 2A.

FIGS. 2A and 2B are also illustrative of standard carbide drill tips having the cutting edges 38, 40 connected via a chisel 42. The cutting edges 38, 40 are parallel to each other, and to the diameter line of the drill bit. However, the cutting edges 38, 40 fail to pass through the center 44 of the drill bit tip.

Drill bit tips addressing the issue of heat generated by the friction of the rotating drill bit are disclosed in the prior art. This combination of friction and heat distort the shape of the drill by distorting the chisel, detracting from the efficiency of the drill to create more heat. The prior art devices inadequately solve the heat problem. As a result, a need exists for a drill bit with a tip structure that efficiently and effectively eliminates heat caused by friction while drilling a bore in an object. The present invention provides such a drill bit tip structure.

SUMMARY OF THE INVENTION

It is, therefore, an object of the present invention to provide a drill bit having a tip structure that provides a drilling impact point that reduces heat generated by friction.

It is further an object of the present invention to provide a drill bit wherein all the touching points between the drill and the drilled bore are cutting points, thereby creating cutting edges.

It is also an object of the present invention to provide a drill bit wherein the tip structure cutting edges are aligned along the diameter line passing through the center point and axis of rotation of the drill bit.

It is another object of the present invention to provide a drill bit wherein the tip structure cutting edges are aligned along the whole diameter line of the drill bit.

It is further an object of the present invention to provide a drill bit wherein the tip structure cutting edges are passed along the inner portion of the drill bit using only the inner part of the diameter line, allowing for the outer part of the cutting edges not to be aligned on the diameter line of the drill bit.

It is also an object of the present invention to provide a drill bit wherein the tip structure is such as to provide a relief angle to the inner cutting edges.

It is also an object of the present invention to provide a drill bit tip wherein the tip structure is such that it provides an easy and inexpensive way to be resharpened without distracting from the main objects of the present invention.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 3:
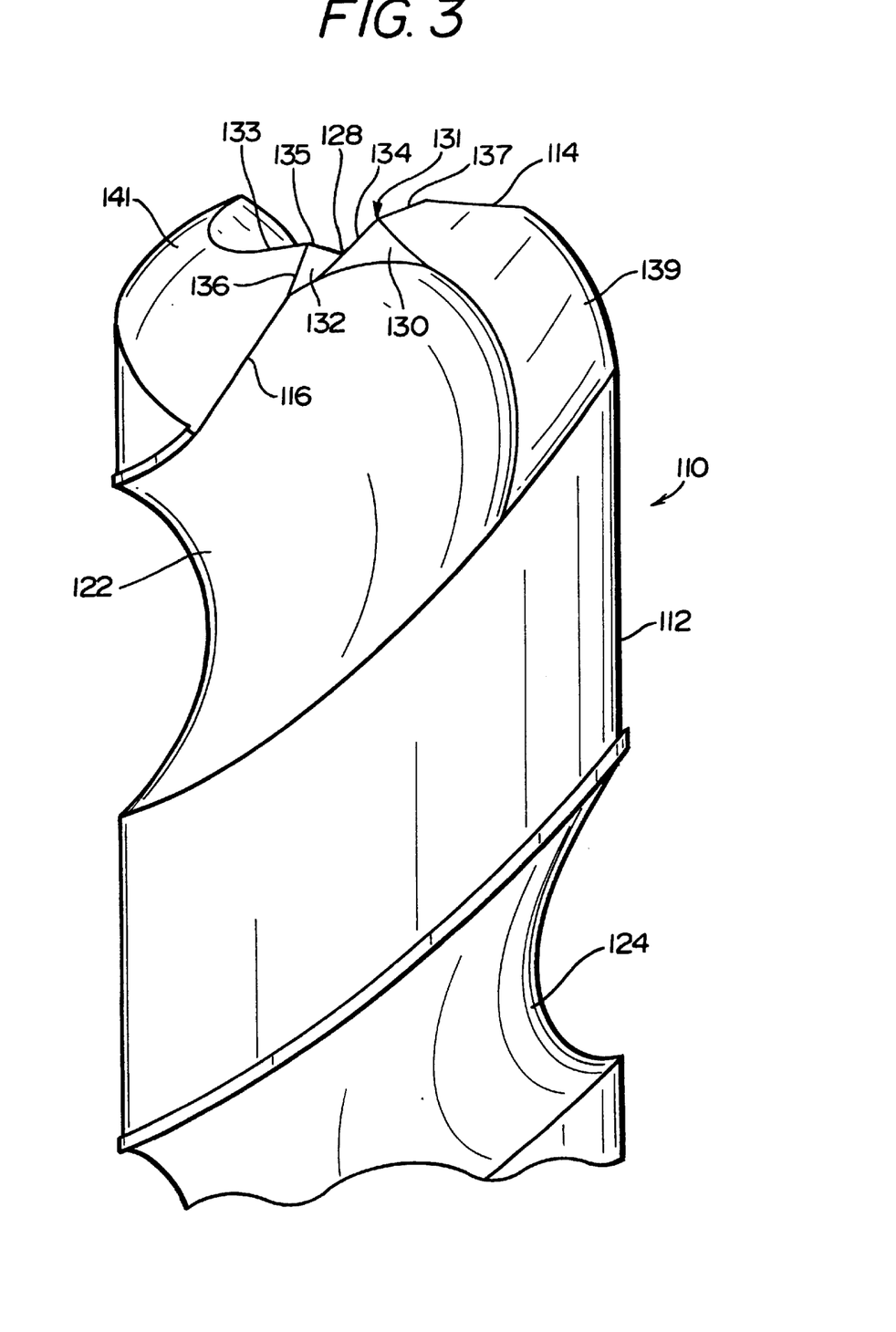
FIG. 3 is a perspective view of the leading end portion of a drill bit according to the present invention.

With reference to FIG. 3, the leading end portion of a drill bit 100 manufactured in accordance with the present invention is disclosed. As those of skill in the art will appreciate, the present drill bit 110 does not include the chisel edge 26 found in the prior art drill bit shown in FIG. 1. As shown in FIG. 3, a "v" shaped notch with axis point 128 is defined by a pair of rake faces 131, 132 aligned face to face. The notch 28 may be manufactured by grinding the drill bit tip at special angles to produce the drill bit 110 in accordance with the present invention. However, other manufacturing techniques could be employed without departing from the spirit of the present invention.

The first rake face 131 has associated first inner and first intermediated cutting edges 134, 137. Similarly, the second rake face 132 has associated second inner and second intermediate cutting edges 135, 136. Juxtaposed to the intermediated cutting edges 136, 137 are the first parallel outer cutting edge 114 and the second parallel outer cutting edge 116. Each of the parallel outer cutting edges is served by the rake faces formed by the spiral groves of the drill bit.

Along with rake faces, each of the cutting edges has its associated relief surface. Specifically, the first relief surface 130 and the second relief surface 133 serve the first and second inner cutting edges 134, 135, respectively. Additionally, a third relief surface 139 serves each of the first intermediate cutting edge 137 and the first outer cutting edge 114 while a fourth relief surface 141 serves each of the second intermediate cutting edge 136 and the second outer cutting edges 116.

The rake faces 131, 132 are positioned face to face along the axis point of the notch 128. Further, each of the faces is aligned with the axis line, ensuring that all the cutting edges are in fact cutting.

Figure 4A:
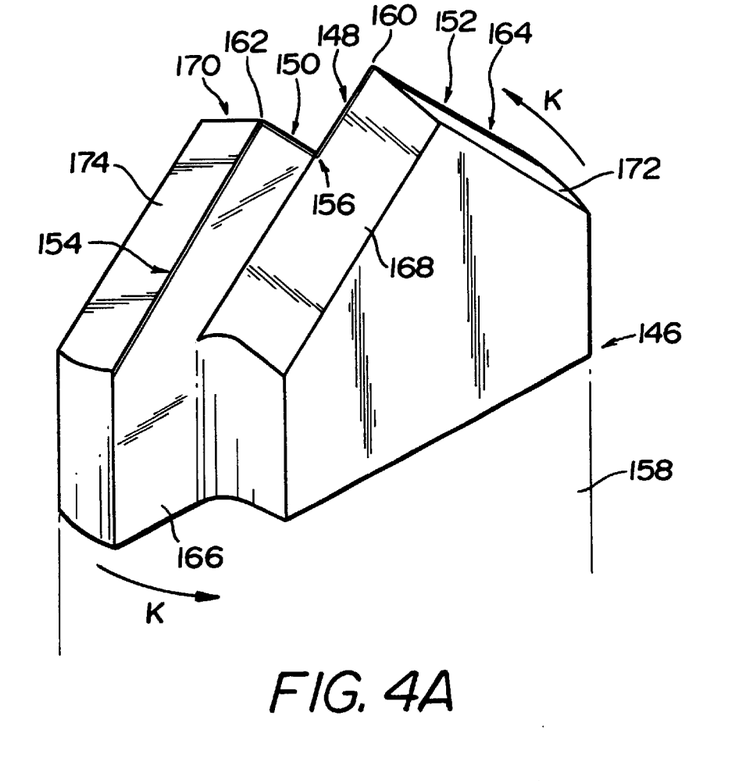
FIG. 4A is a perspective view of the unitary piece drill bit tip according to the present invention.
Figure 4B:
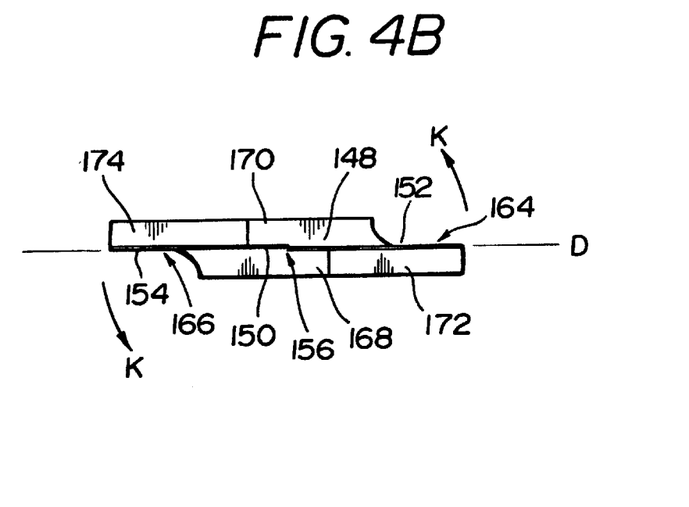
FIG. 4B is a plan view of the unitary piece drill bit tip of FIG. 4A.

With regard to the embodiments disclosed in FIGS. 4A and 4B, an alternate drill bit tip 146 in accordance with the present invention is disclosed. The drill bit tip includes four distinct cutting edges defining a pair of inner and outer cutting edges. Specifically, the drill bit tip 146 includes a first inner cutting edge 148 and a second inner cutting edge 150 connected at a center point 156. The center point 156 defines the axis of rotation for the drill bit shank 158 with the direction of rotation in direction K.

The drill bit also includes a first outer cutting edge 152 and a second outer cutting edge 154. The first and second outer cutting edges 152, 154 respectively contact the first and second inner cutting edges 148, 150. The first and second outer cutting edges 152, 154 are located distally from the center point 156 with respect to the inner cutting edges 148, 150. The border along the point of contact between the first inner cutting edge 148 and the first outer cutting edge 150 defines a first apex 160 on the drill bit tip 146. Similarly, the border along the point of contact between the second inner cutting edge 150 and the second outer cutting edge 154 defines a second apex 162 on the drill bit tip 146. The first and second apexes 160, 162 form a slot that prevents the drill from sliding while in use. Further, the "v" shaped notch, which forms the apexes, enables a chiseless drill bit to be manufactured. Also, the drill bit is formed from a flat piece of high density boron nitride ground into shape, or casting into shape and then ground accordingly. In this instance, the opposing rake faces meet face to face along the diameter line. This structure maintains that all points of the cutting edges are cutting into the material while providing wide backing strength to the inner cutting edges near the axis point.

According to the preferred embodiment of the disclosed invention, the first and second inner cutting edges 148, 150 and the first and second outer cutting edges 152, 154 are aligned in a single plane, or diameter line D, that passes through the center point 156 of the drill bit tip 146. This alignment provides a drill bit tip 146 in which all the touching points between the drill bit tip 146 and the drilled bore are cutting points. This tip structure reduces friction to negligible amounts and naturally eliminates the generated heat from drilling. Because all touching points are cutting points, the material is drilled at all points of contact (via the cutting edges), rather than being pushed aside by a standard drill bit tip having a chisel.

As illustrated, the first and second inner cutting edges 148, 150 and the first and second outer cutting edges 152, 154 are formed from a unitary piece of material. The drill bit tip 146 includes a first rake surface 164 and a second rake surface 166. Each of the rake surfaces 164, 166 functions in a conventional manner.

In addition, the drill bit tip 146 includes four distinct relief surfaces: a first relief surface 168, a second relief surface 170, a third relief surface 172 and a fourth relief surface 174. The first and second relief surfaces 168, 170 are aligned behind the first and second inner cutting edges 148, 150, respectively. The third and fourth relief surfaces 172, 174 are aligned behind the first and second outer cutting edges 152, 154, respectively. The overall positioning and design are such that there is minimal contact between each of the relief surfaces and the material being drilled. Hence, friction and heat are reduced during drilling.

Figure 4C:
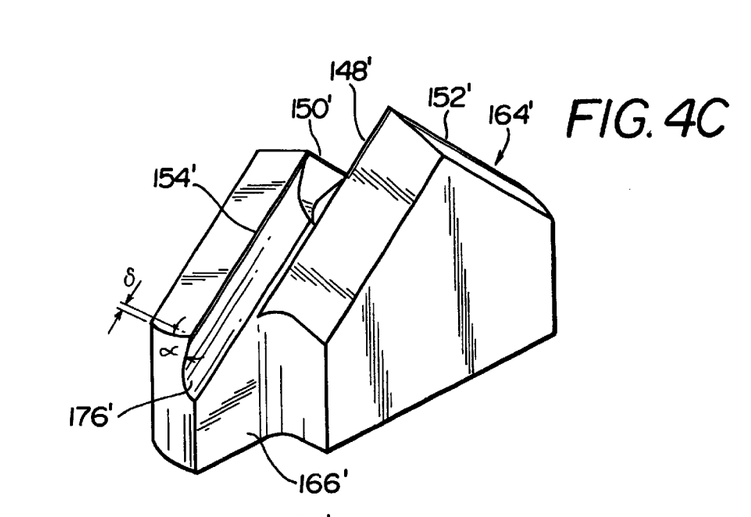
FIG. 4C is a perspective view of an alternate unitary piece drill bit tip according to the present invention with a true (positive) rake face angle.
Figure 4D:
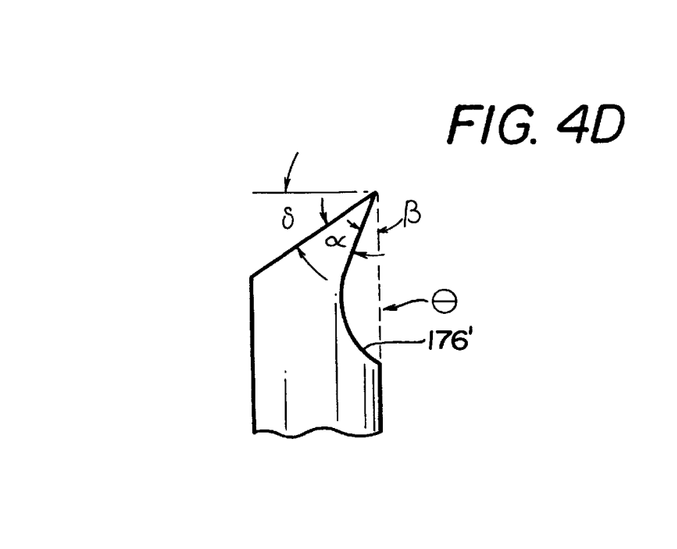
FIG. 4D is a side view of the cutting edge of the alternate unitary piece drill tip of FIG. 4C with a true rake angle.

FIGS. 4C and 4D disclose an alternate embodiment including a true rake face angle β. Specifically, the drill bit includes first and second inner cutting edges 148', 150' and first and second outer cutting edges 152', 154' similar to those disclosed with regard to the embodiment disclosed in FIGS. 4A and 4B. However, each of the cutting edges is formed with a true rake (face) angle. The cutting edge is set at a true rake angle β that differs from the cutting edge of the drill bit in FIG. 4A by an angle β, wherein the cutting edge in FIG. 4A is aligned perpendicular to a cross section of the drill bit with an overall cutting edge of 90° (cutting edge α=90°−β).

Figure 4E:
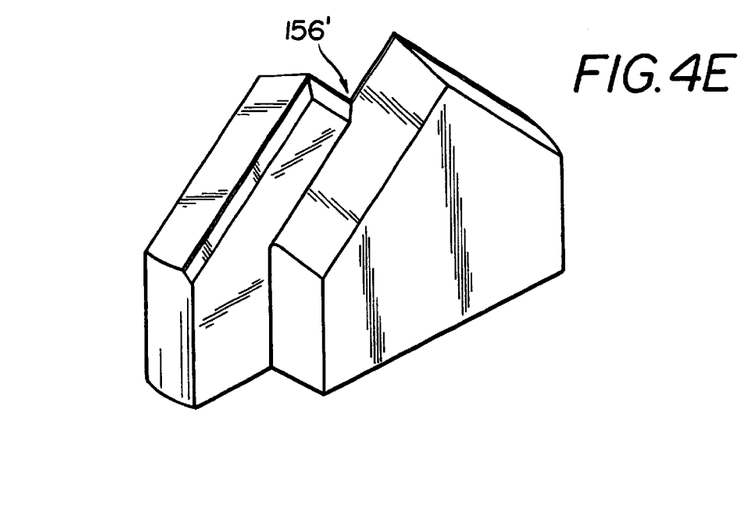
FIG. 4E is a perspective view of an alternate unitary piece drill bit tip according to the present invention with a negative rake angle.
Figure 4F:
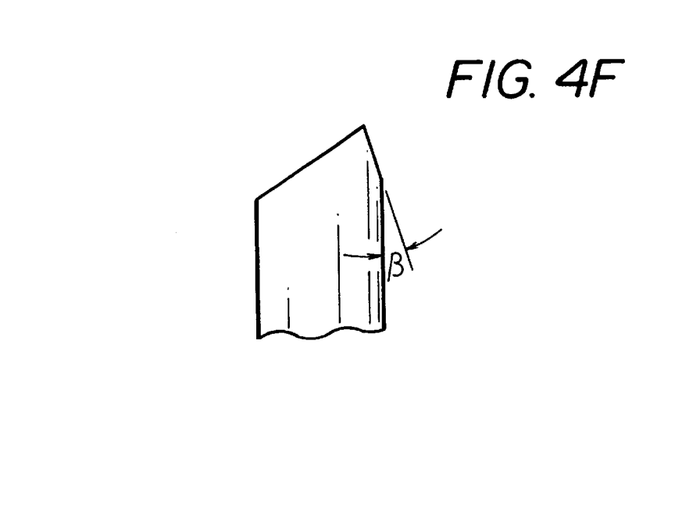
FIG. 4F is a side view of the cutting edge of the alternate unitary piece drill bit tip of FIG. 4E with a negative rake angle.

For steel cutting tools, the desired rake may be achieved with a ground chip-control groove 176 and is formed in the first and second rake surfaces 164', 166'. FIGS. 4E and 4F illustrate a negative rake face angle unlike the positive rake face angle illustrated in FIGS. 4C and 4D.

In a preferred embodiment, the relief angle is about 7°. However, the preferred rake angles depend on the material to be drilled and on the speed of rotation. As such, the rake angle may be varied without departing from the spirit of the present invention.

In general, β is between 0° and 6° and is referred to as the true rake angle(or negative rake angle when the profile is as shown in FIGS. 4E and 4F). Specific instances for different materials make this concept easier to understand. For instance, with steel cutting tools usually a true, positive rake angle is employed which is embodied in the ground chip-control groove. Alternatively, a 0° rake angle is preferred for other kinds of metal, as well as soft and abrasive materials like chipboard, fiber and plastic. Lastly, a negative rake angle is preferred for harder, grinding materials, such as, stone and glass.

As disclosed above, the angled cutting edge, named the true rake face angle, is formed by the groove so it is part of the groove. The groove adds sharpness to the cutting edge chip control, and facilitates the removal and disposal of the chip from low strength materials while reducing cutting pressure.

Another feature illustrated in FIGS. 4A to 4F is the comprehensive length of the cutting edges. Specifically, the tip structure cutting edges are not only aligned along the diameter line D, but each of the cutting edges 148, 150, 152, 154 combine to form the entire length of the whole diameter line of the drill bit. This enhances the drill bit structure by providing a relief angle without weakening the drill bit tip. This also allows for a positive, negative or zero degree rake angle. For different materials and different speeds, this structure aids in heat and friction reduction.

Figures 5A, 5C:
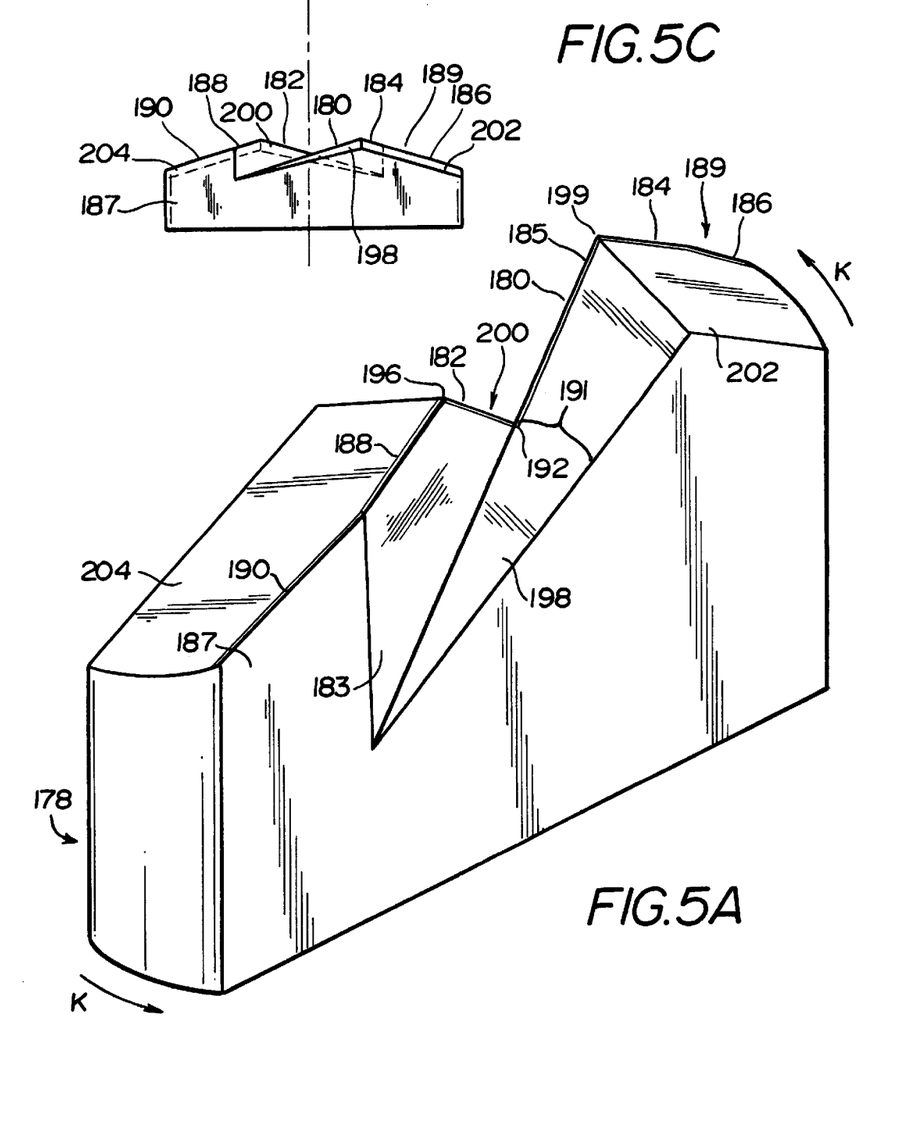
FIG. 5A is a perspective view of an alternate unitary piece drill bit tip according to the invention.
FIG. 5C is a plan view of the alternate unitary piece drill tip of FIG. 5A.
Figure 5B:
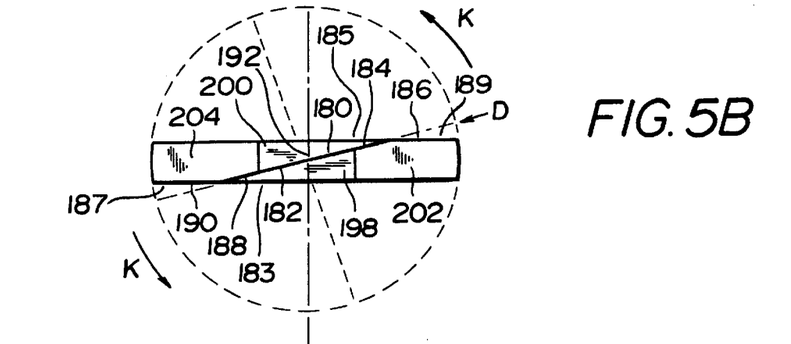
FIG. 5B is a top view of the alternate unitary piece drill tip of FIG. 5A.

FIGS. 5A and 5B are illustrative of another embodiment of the present drill bit tip. The drill bit tip 178 includes three pairs of cutting edges. Specifically, the drill bit tip 178 includes a first inner cutting edge 180 and a second inner cutting edge 182, wherein the first and second inner cutting edges 180, 182 connect at a center point 192. The drill bit tip 178 also includes a first intermediate cutting edge 184 connected to an associated first parallel cutting edge 186. The drill bit tip 178 also includes a second intermediate cutting edge 188 connected to an associated second parallel cutting edge 190. This provides the outer portion of the drill bit tip 178 with a pair of dual cutting edges.

As illustrated in FIG. 5B, only the first and second inner cutting edges 180, 182 and the first and second intermediate cutting edges 184, 188 are aligned along the diameter line D passing through the center 192 of the drill bit. The first and second parallel cutting edges 186, 190 are positioned parallel to each other and to an alternate diameter line passing through the center of the drill bit. The first and second parallel cutting edges 186, 190 are not aligned along the same diameter line D with which the first and second inner cutting edges 180, 182 or the first and second intermediate cutting edges 184, 188 are aligned. The first series of cutting edges 180, 184, 186 cut in one direction from the axis 92 while the second series of cutting edges 182, 188, 190 cut in the other direction.

The first intermediate cutting edge 184 contacts the first inner cutting edge 180 and the second intermediate cutting edge 188 contacts the second inner cutting edge 182. The border along the points of contact between the first inner cutting edge 180 and first intermediate cutting edge 184, as well as the second inner cutting edge 182 and second intermediate cutting edge 188 respectively define first and second apexes 194, 196 on the drill bit tip 178. These apexes 194, 196 cut and form a slot that prevents sliding during drilling.

Each of the first and second inner cutting edges 180, 182 has an associated relief surface 198, 200. Further, the two dual cutting edges, formed by the connection between the first and second intermediate cutting edges 184, 188 and their respective parallel cutting edges 186, 190, each have an associated relief surface. Specifically, the first dual cutting edge, formed by the connection of the first intermediate cutting edge 184 and first parallel cutting edge 186, is associated with a first relief surface 202. Also, the second dual cutting edge, formed by the connection of the second intermediate and second parallel cutting edges 188, 190, is associated with a second relief surface 204.

While the first intermediate cutting edge 184, which contacts the first inner cutting edge 180, is on the same first rake face 185, the second intermediate cutting edge 188, which contacts the second inner cutting edge 182, is on the same second rake face 183. Both rake faces 185 and 183 are positioned in an opposing, face to face direction and are aligned along the diameter line of the drill passing through an axis point 192.

Further, the first parallel cutting edge 186 has a rake face 189 while the second parallel cutting edge 190 has a rake face 187. The rake faces 187, 189 are aligned in parallel, opposing directions while being spaced apart from the diameter line which passes through the central axis.

If the "v" shaped notch is smaller than that illustrated in FIG. 5A, then there is a possibility that the inner cutting edges 180, 182 will contact the outer cutting edges 186, 190 directly without the intermediate cutting edges 184, 188.

Figure 6:
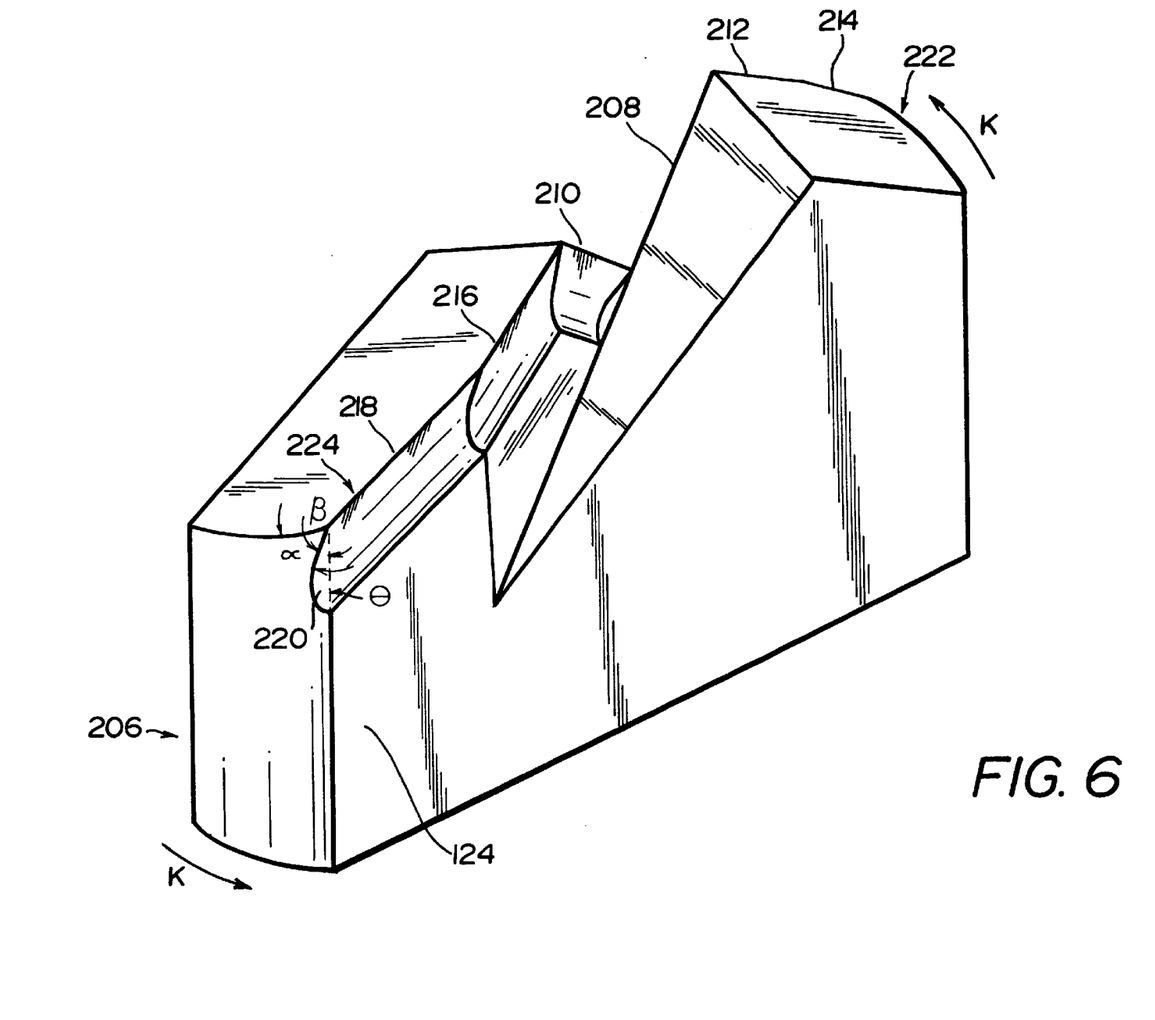
FIG. 6 is a perspective view of an alternate unitary piece drill bit tip according to the invention.

FIG. 6 illustrates a drill bit tip 206 similar to the drill bit tip 178 illustrated in FIG. 5A. Specifically, the drill bit tip 206 includes a pair of first and second inner cutting edges 208, 210 and a pair of first and second intermediate cutting edges 212, 216 aligned along a diameter line D of the drill bit. The drill bit also includes first and second parallel cutting edges 214, 218 aligned parallel to each other and to a diameter line that is not diameter line D.

The drill bit tip 206 also includes an angled cutting edge. The angled cutting edge is set at an angle α that differs from the cutting edge in FIG. 5A by an angle β which is an angled rake face (the cutting edge in FIG. 5A is aligned perpendicular to a cross section of the drill bit with an overall angled cutting edge θ (90°), which is the sum of the angles α and β). As disclosed above, the preferred angles are dependent upon the material being drilled. By reducing the cutting angle θ by an angle β, a groove is formed in the first and second rake surfaces 222, 224. The groove provides easy chip control, especially for metal. It should further be noted that the inner tip of the drill bit illustrated in FIG. 6 is of the same arrangement of the tip illustrated in FIG. 5A whereas the outer part is parallel but works essentially in the same manner.

Figure 7A:
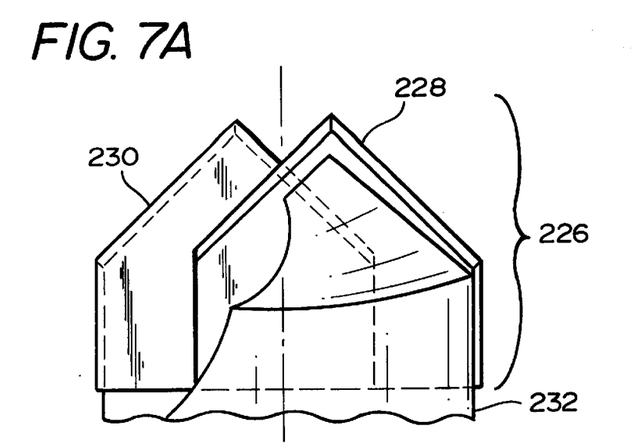
FIG. 7A is a side elevation view of an alternate dual piece drill bit tip in accordance with the present invention.
Figure 7B:
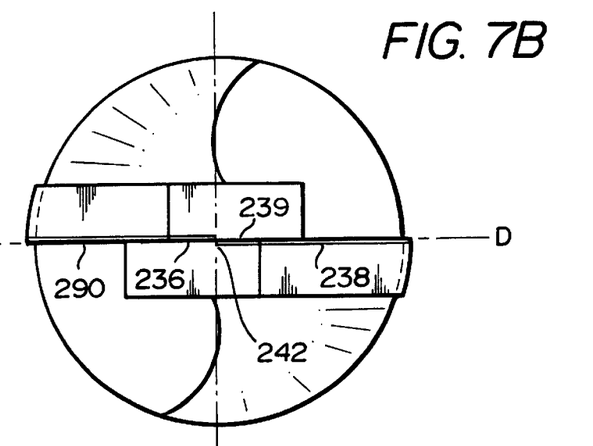
FIG. 7B is a top elevation view of the alternate dual piece drill bit tip of FIG. 7A.
Figure 7C:
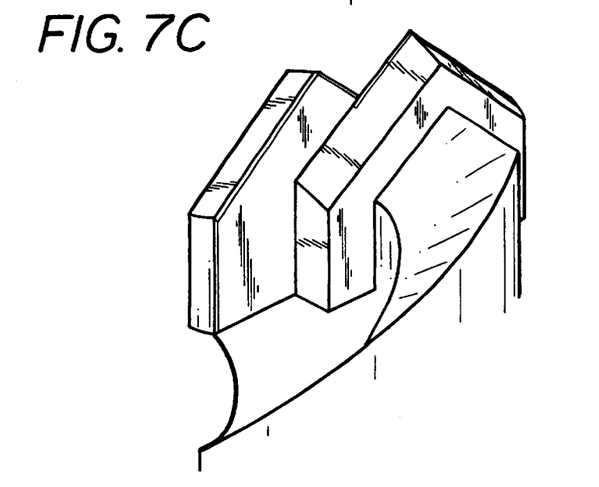
FIG. 7C is a perspective view of the alternate dual piece drill bit tip of FIG. 7A.

FIGS. 7A to 7C illustrate another embodiment of a drill bit tip 226 formed in accordance with the present invention. The drill bit tip is constructed from two distinct pieces. Specifically, a first piece 228 and a second piece 230 are coupled together to form a unitary drill bit tip. The coupling of the individual pieces can be accomplished via one of several well known coupling methods including, but not limited to, welding, soldering, brazing or sintering, without departing from the spirit of the present invention. In accordance with the preferred embodiment, the two piece drill bit tip 226 is connected to and supported by the shank 232. All the pieces used in the drill bits are made from super-hard, high density alloys including but not limited to, boron nitride, cemented carbide or tungsten carbide with or without diamond or polycrystalline diamond (DIA). This design provides a high-performance drill bit tip for better use and durability.

The drill bit tip 226 incorporates the same design features as the drill bit tip illustrated in FIG. 4A. Specifically, the drill bit is designed such that the drill bit tip 126 has a pair of inner cutting edges 234, 236 and a pair of outer cutting edges 238, 240 aligned in a single plane along a diameter line D that passes through the center point 242. As illustrated on the drill bit tip 226 in FIGS. 7B and 7C, the shadowed lines represent the cutting edges.

FIGS. 8 to 14 each illustrate alternate embodiments of the present invention. Specifically, each of these drill bit tips is formed in a similar fashion to the drill bit tip 140 illustrated in FIG. 4A. Each drill bit tip, therefore, is designed such that all touching points are cutting edges. In addition, each drill bit tip satisfies the construction requirement of a plurality of cutting edges aligned along a common diameter line.

Figure 8:
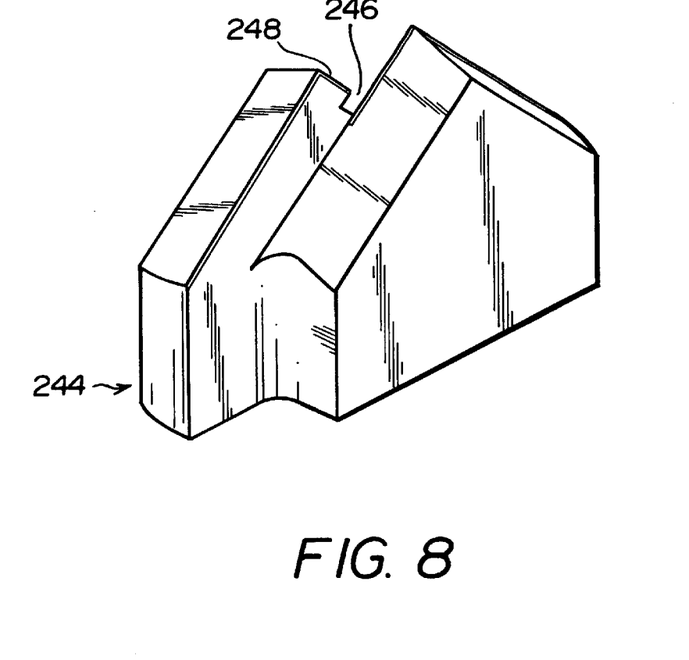
FIG. 8 is a perspective view of an alternate unitary piece drill bit tip in accordance with the present invention.

In FIG. 8, the drill bit tip 244 incorporates a notch, or slot 246, in at least one of the inner cutting edges 248.

Figure 9:
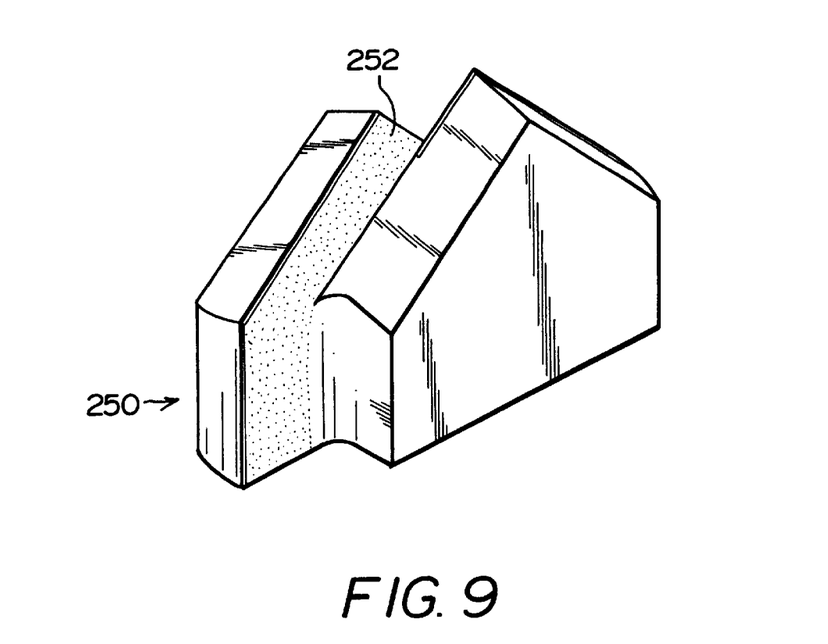
FIG. 9 is a perspective view of an alternate unitary piece drill bit tip in accordance with the present invention.

FIG. 9 illustrates a variation on the drill bit tip 250 of FIG. 4. In accordance with the embodiment, diamonds coat at least a portion of at least one rake surface of the drill bit tip 250. There are various ways that the diamond coating can be applied to the rake surface including gluing, centering and other well known plating methods. Further, by using diamonds on the surface of the drill bit tip 250 the drill bit may be used to drill harder and abrasive materials, while decreasing wear and tear on the drill bit. The slot is used to positionally maintain the drill bit when it is being reshaped. The positioning of the slot does not disturb drilling because the other cutting edge is cutting the center according to the present invention. As disclosed with regard to FIGS. 7B and 7C, the shadowed lines represent the cutting edges.

A thin layer of synthetic diamond crystals (polycrystalline diamond) 252 are bonded to a tungsten carbide carrier under very high pressure and temperatures. This combination is very useful for high abrasive materials such as chipboard, fiberboard, M.D.F. and fibrous plastics. Due to the hardness and abrasiveness of materials such as chipboard, fiberboard, M.D.F. and fibrous plastics, standard drill bits tend to wear out quickly. For instance, where a high speed steel bit might be able to drill a single hole, a high-density boron nitride bit might drill ten times more and a drill bit formed with polycrystalline diamond may be able to drill as many as 50 to 200 times the number of holes. Therefore, the added expense for these drill bit composites is recouped in the number of drill bits and the frequency the bit must be changed.

Figure 10:
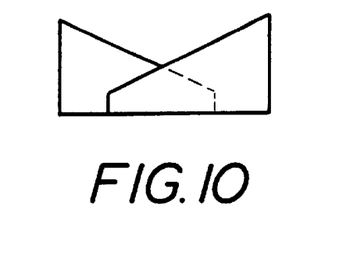
FIGS. 10, 11, 12, 13A, 13B, 13C and 14 are side views of alternate unitary piece drill bit tips in accordance with the present invention.
Figure 11:
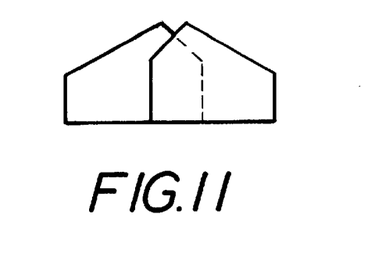
Figure 12:
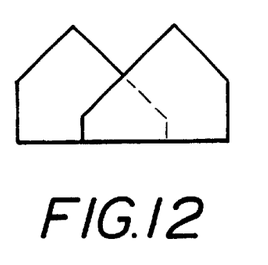

With regard to the drill bit tips illustrated in FIGS. 10, 11 and 12, each is a modified structure of the drill bit tip disclosed in FIGS. 4A and 7A. Specifically, the angle formed by the intersection of the inner cutting edges is varied. Further, the lengths of the various inner and outer cutting edges are also varied. This allows for different tips to be used in different applications.

Figure 13A:
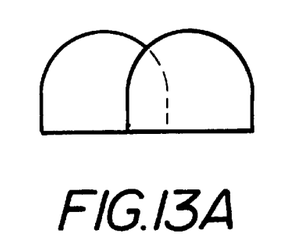
Figure 13B:
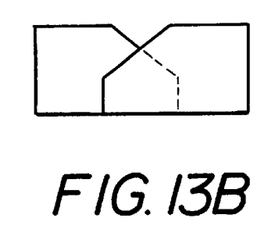
Figure 13C:
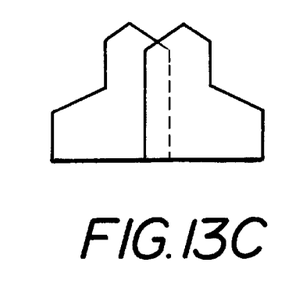

FIGS. 13A and 13B illustrate alternative embodiments of the present invention wherein the drill bit is formed with a rounded tip having all of its edges as cutting edges. The drill bit also includes squared off edges perpendicular to the side of the shaft cylinder.

Figure 14:
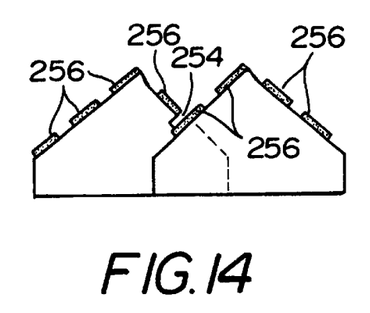

FIG. 14 is a modified version of the drill bit illustrated in FIG. 8. The bit has at least one notch 254 and a plurality of raised cutting portions 256 positioned along each of the aligned cutting edges. This allows for reducing the size of every single chip. In addition, since the polycrystalline diamond drill bit is a very expensive tool, this shape requires fewer diamond pieces which overlap the gaps.

Figure 15A:
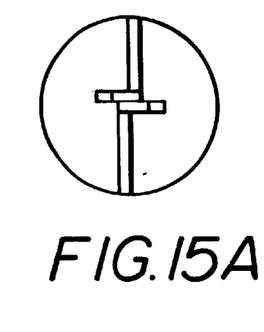
FIG. 15A is a plan elevation view of a one sided drill bit tip in accordance with the present invention.
Figure 15B:
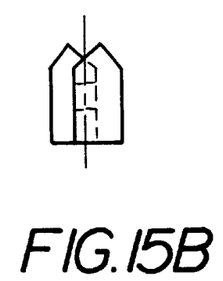
FIG. 15B is a side view of the one sided drill bit tip of FIG. 15A.
Figure 15C:
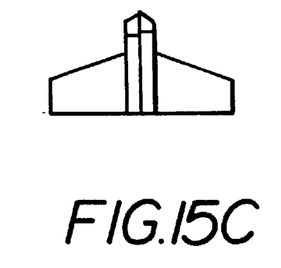
FIG. 15C is a top view of the one sided drill bit tip of FIG. 15A.

FIGS. 15A to 15C illustrate an alternative to a standard symmetrical drill bit tip construction. The drill bit tip 258 is designed as half of the drill bit tip illustrated in FIG. 4. The drill bit tip 258 includes an inner cutting edge and an outer cutting edge such that both the inner cutting edge and the outer cutting edge aligned along a diameter line that passes through the center of the drill bit tip. As with the standard symmetrical drill bit disclosed, each of the contact edges are all cutting edges. This drill bit design can be stronger for specialized uses and, therefore, less flexible because there is only one slot. This provides the same heat minimization due to reduced friction and costs less to manufacture.

As discussed above, FIGS. 3 to 14 are illustrative of the present invention, each disclosing a drill bit tip having no chisel. Further, each of the drill bit tips illustrated in FIGS. 3 to 14 has a plurality of cutting edges formed such that the cutting edges are located within the same plane, or along the same diameter line, with respect to each other. Furthermore, the plane or diameter line, along which the edges are aligned, passes through a central point of the drill bit. Each of the various drill bit tips embodied in FIGS. 3 to 14 of the present specification is symmetrical in form. Therefore, splitting the drill bit along axially along a diameter line will produce two drill bit halves that are virtually identical in form and size. Also, for each of the aforementioned drill bits according to the present invention, at least the inner part of the rake faces is aligned with the axis line of the drill and includes a cutting groove which provides a true rake angle.

FIGS. 15A, 15B and 15C, also discussed above, are illustrative of a drill bit tip embodying the present invention; that is drill bit tips having no chisel in the center of the bit tip. However, unlike the drill bits illustrated in FIGS. 4 to 14, the drill bit tip disclosed in FIGS. 15A, 15B and 15C is formed with only one side along which cutting edges exist. There is no chisel in the center because the cutting edge is exactly on the center so all the material from the center point to the outer diameter is cut by the cutting edge. This ensures that all the material being contacted is being cut rather than being pushed.

Figure 16A:
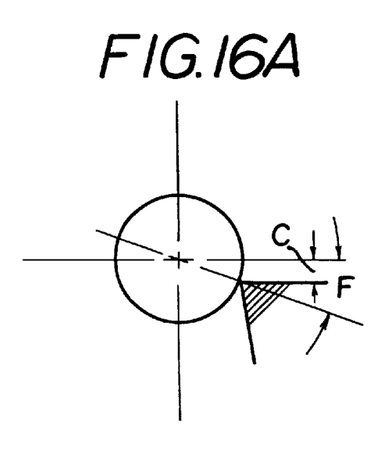
FIGS. 16A, 16B and 16C are plan views of various cutting profiles.
Figure 16B:
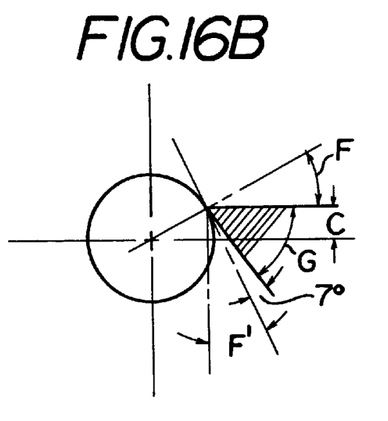
Figure 16C:
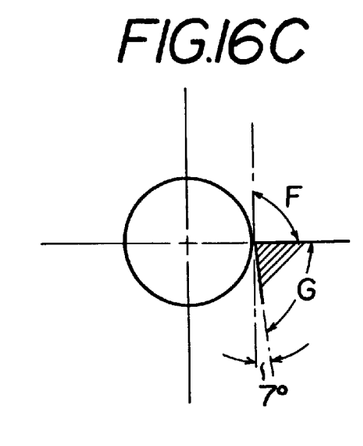

As disclosed in a preferred embodiment of the present invention, each of the inner and intermediate cutting edges has a rake face which stands opposingly face to face on the exact diameter line such that both rake faces pass through the axis. When cutting round material with a cutting tool, the cutting edge and the rake face must be in this aforementioned orientation. If the cutting edge is before the diameter, a negative rake face angle is formed providing a true, larger relief angle, as illustrated in FIG. 16A wherein C is the distance of the cutting edge from the center and while F is a negative rake angle. This results in the center remaining uncut. Alternatively, if the cutting edge is above the diameter, a large positive rake face is formed. This means a bigger relief angle is needed to provide a relief angle between the material and the cutting edge, as illustrated in FIG. 16B, and makes the cutting edge very weak. As seen in FIG. 16B, C is the distance from the diameter line with F being the large true rake angle. It's not until the cutting edge is formed along the exact diameter, as illustrated in FIG. 16C, (and as embodied in the present invention) that a normal rake face angle and normal relief angle are produced. This structure provides strong support for the cutting edge and allowing the present drill bit to achieve results not found in the prior art.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A drill bit for drilling a bore, comprising:
   a body having a shank portion, a tip portion and an axis of rotation therethrough;
   said tip portion having a plurality of touching points wherein all of said plurality of touching points form a plurality of cutting edges with associated rake angles, said plurality of cutting edges include an inner first pair of cutting edges defining a first cutting edge and a second cutting edge and an intermediate second pair of cutting edges defining a third cutting edge and a fourth cutting edge wherein the first cutting edge, the second cutting edge, the third cutting edge and the fourth cutting are aligned along the entire length of a common diameter line; and
   the plurality of cutting edges further including an outer third pair of cutting edges defining a fifth cutting edge and a sixth cutting edge, the fifth cutting edge and the sixth cutting edge being parallel.

2. The drill bit according to claim 1, wherein said first cutting edge and said second cutting edge are located remote from said axis of rotation and aligned along the same diameter line to form a chiseless tip.

3. The drill bit according to claim 2, wherein said third cutting edge juxtaposes said first cutting edge on a distal end of said first cutting edge from said axis of rotation and said fourth cutting edge juxtaposes said second cutting edge on a distal end of said second cutting edge from said axis of rotation.

4. The drill bit according to claim 3, wherein said third and fourth cutting edges are aligned along the same diameter line as said first and second cutting edges to form a chiseless tip.

5. The drill bit according to claim 1, wherein said third cutting edge juxtaposes said first cutting edge on a distal end of said first cutting edge from said axis of rotation and said fourth cutting edge juxtaposes said second cutting edge on a distal end of said second cutting edge from said axis of rotation.

6. The drill bit according to claim 1, wherein said cutting edges have a positive rake angle.

7. The drill bit according to claim 1, wherein said tip portion is composed of two pieces.

8. The drill bit tip according to claim 1, wherein said fifth and sixth cutting edges are aligned parallel to a different diameter line than said first and second cutting edges.

* * * * *